Dec. 8, 1953            C. L. SMITH            2,662,018
FROZEN FOOD INDICATOR
Filed June 14, 1949
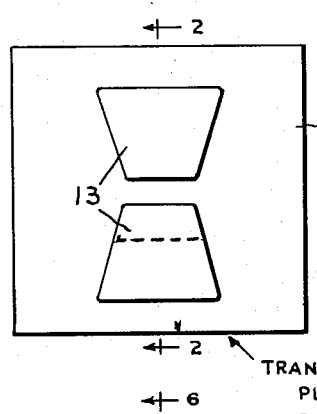
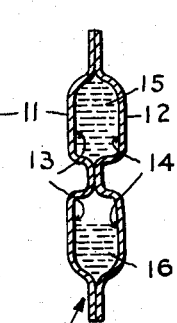
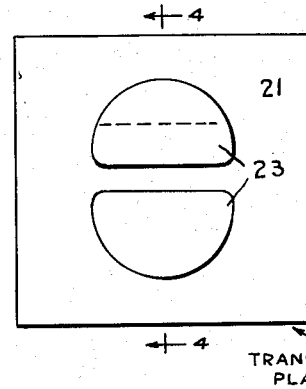
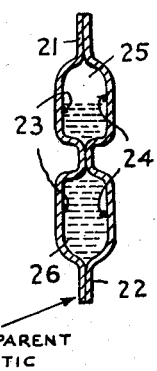
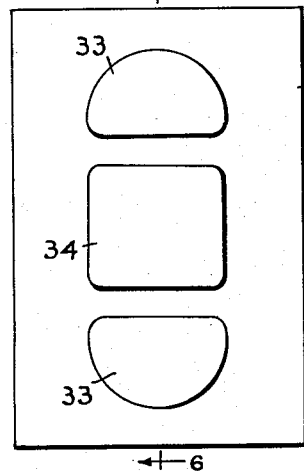
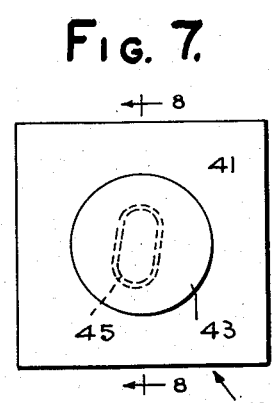
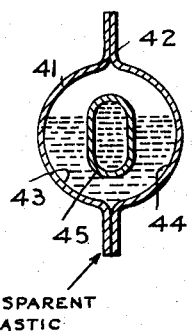
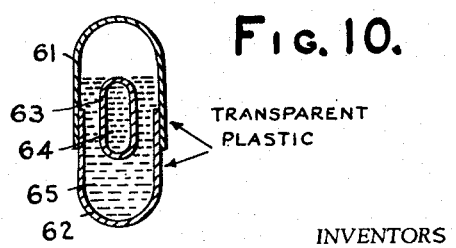
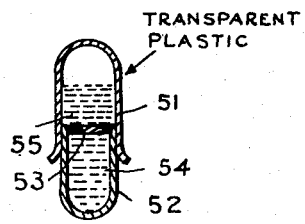
INVENTORS
CLARENCE L. SMITH
BY *Emery Holcombe & Blair*
ATTORNEYS Patented Dec. 8, 1953

2,662,018

UNITED STATES PATENT OFFICE 2,662,018

FROZEN FOOD INDICATOR

Clarence L. Smith, Seabrook, N. J.

Application June 14, 1949, Serial No. 98,950

6 Claims. (Cl. 99—192)

This invention relates to a tell-tale device for indicating the temperature to which a package of frozen food may have been exposed subsequent to freezing, and aims to detect any package containing spoiled or deteriorated food or biological product due to exposure to a temperature above that at which the food or other product must be kept in order to preserve it in first class condition.

The process of "quick freezing," as an art of preserving food and other products, is of extreme importance because by its use, it is possible to preserve food in its original fresh condition for an indefinite period of time. For example, meats and fish, quickly frozen, or, in other words, frozen in a very short period of time, retain their pristine qualities and flavors because the cells of the tissues are not broken down by the freezing action. Likewise, fruits, liquids such as milk and fruit juices, and many other food products, will retain their original freshness almost indefinitely if frozen rapidly and kept in a completely frozen condition.

It has become the practice to quick freeze such products and to ship the frozen products to various markets and retail dispensaries where they are stored in a refrigerated place until disposed of for consumption. The products must be maintained without interruption in a completely frozen state until dispensed to the consumer if the advantages of the quick freezing process are to be retained, and for this purpose a lower temperature than that of melting water ice is necessary for preventing deterioration of most quick frozen food products.

Also in the case of vaccines and other medicinal and pharmaceutical supplies, it is often necessary to maintain the temperature thereof below freezing without interruption, if such supplies are to retain their medicinal value.

It sometimes happens, however, that due to accident or other cause, the frozen products are permitted to thaw and are subsequently refrozen slowly before they are dispensed. Such refrozen products are not the products of quick freezing and should not be dispensed as such even if not dangerous to health, as is explained in the Chase patent, No. 2,460,215, dated January 25, 1949.

Also it sometimes happens that the temperature of vaccines etc. rises above the danger point and even though the temperature is subsequently reduced, the medicinal value of the vaccines etc. may have been destroyed.

My invention particularly relates to these latter situations and has for its objects to provide a method of, and means for indicating to the purchaser the exact condition of the frozen products or vaccines; that is, to indicate to him whether the frozen goods have or have not been refrozen, or whether the vaccines have ever reached a temperature above the danger point.

The invention further aims to detect the occurrence of a temporary rise in temperature in excess of a safe maximum in a "deep freeze" compartment, store or household refrigerator, or some portion of a cold storage warehouse at any time due to accident or unusual conditions of use, failure of the power source or other cause beyond the control or knowledge of the householder or proprietor.

I accomplish these objects by means of an indicator or tell-tale accompanying the products or the package containing the products or placed in the space to be safeguarded, the indicator being colored in such a way that the original appearance is destroyed when the goods have once been thawed or the space heated above the danger point, and of such a character that the original appearance cannot be restored even if the goods are refrozen or the space again cooled to its normal temperature.

Such a device to be effective and of value for the purposes named should be non-toxic, sensitive to temperature change at the critical range, and readily adjustable to a desired indicating point, and it must give a permanent indication of any temperature rise above the predetermined point for which it is adjusted; and in addition it must be strong and sturdy enough to withstand rough handling and usage, readily adaptable to different sizes and designs of containers and conditions of use, simple in its construction and mode of operation, and of very low unit cost. My device meets all these requirements and is the only indicator known combining these advantages in sufficient degree to have extended commercial application under present day conditions.

Further objects and characteristics of my invention appear in connection with the following description of the several embodiments thereof illustrated in the accompanying drawings, wherein:

Figs. 1 and 2 are respectively a side view and a median cross section on the line 2—2 in Fig. 1 of a preferred form of the invention;

Figs. 3 and 4, and 5 and 6, respectively, are similar views to Figs. 1 and 2, the cross sections being taken on the lines 4—4 and 6—6, respectively, in Figs. 3 and 5 showing modifications of the invention;

Figs. 7 and 8 are respectively a side view and a cross section on the line 8—8 in Fig. 7 of still another modification of the invention; and Figs. 9 and 10 are central cross sections of further modifications. In all of the views the devices are shown prior to use.

In the device illustrated in Figs. 1 and 2, the walls 11, 12 are made of any suitable transparent sheet material having sufficient strength to resist rupture in ordinary handling, such as cellophane, and other synthetic plastic materials well known in the container art, formed with mating depressions 13, 14 to present two cavities 15, 16 when secured together with these depressions in opposed registration. One of the cavities is filled and the other is partly filled with similar anti-freezing solutions, that in the partly filled cavity being adjusted to melt at the desired temperature, the other melting at a slightly lower temperature, and sealed by heat and pressure or suitable adhesive placed between their contacting surfaces, care being taken to prevent commingling of the solutions, which are colored differently so as to be readily distinguishable. For example, a harmless liquid food dye of yellow color, of which several are known, and of a salinity to freeze at the safe temperature for maintaining the character of the product to be safeguarded, is disposed in one of the cavities 15, 16 and in the other cavity is placed a similar solution freezing at a slightly lower temperature and containing a suitable dye of a blue color, the amount and strength of the colors being such as to produce a vivid green when commingled which will retain its brilliancy when refrozen.

In using the device for indicating the condition of frozen food products it is placed in the container with the food or other product to be frozen and subjected therewith to the desired quick freezing temperature, which freezes the liquid in both cavities 15, 16, that in the partly filled container freezing first without bursting the narrow strip separating them which bursts when the lower freezing solution freezes, so that when the package is exposed to a temperature at which the liquids melt they will commingle and change color, thereby warning the prospective user that the package since it was frozen has been subjected to a temperature too high for maintaining the quality of the product unimpaired. This temperature varies widely with different food products. For example, frozen peaches in a sugar syrup will start to defrost and deteriorate if exposed to a temperature in excess of 17° F., while frozen cauliflower does not defrost and remains in good condition if the temperature is kept below 28° F.

The device illustrated in Figs. 3 and 4 is similar in construction to that shown in Figs. 1 and 2 except for the shape of the depressions 23, 24 pressed in the sheets of transparent material 21, 22 which form the cavities 25, 26 for containing the two differently colored low-freezing solutions, and functions in the same way.

Such an indicator may be readily made and filled by a suitable automatic machine from easily accessible cheap materials such as polythene, pliofilm, cellophane and like transparent plastics, the saline solutions used being cheap and readily adjusted to the particular freezing temperature desired by means of a hydrometer.

In Figs. 5 and 6 a different form of the invention is illustrated wherein the transparent sheets 31, 32 are impressed with three complementary pairs of depressions 33, 34, 33, which when secured together form three cavities 36, 35, 36, the middle one of which is left unfilled and the two end ones of which are completely filled with low melting liquids of different colors, preferably the liquids in the two end cavities having slightly different freezing temperatures. The effect on quick freezing a food package containing this device is to freeze the liquids in the end cavities one after the other and in so doing burst apart the thin adherent portions of the sheets constituting the separating walls between the cavities, so that on remelting the liquids commingle with consequent change in color.

In the modification of the device shown in Figs. 7 and 8, which is intended for all purposes for which such an indicator is adapted, the outer container is composed of two transparent sheets 41, 42, formed with mating cup shape depressions 43, 44 together making a cavity which is partly filled with a colored liquid having the desired melting point below the danger point of the storage space to be safeguarded or the food or other product for which the indicator is designed. An inner capsule 45 is filled with a liquid of slightly lower melting point but having a different color. In use this device is placed in the storage space or food package and frozen with the contents, this freezing solidifying the liquid in the outer container before breaking the capsule 45 so as to permit the two liquids to commingle upon melting.

Fig. 9 illustrates a simple form of indicator consisting of two transparent shells 51, 52 each closed at one end and with their open ends fitting one into the other to form a container. The inner shell 52 is closed at its open end by a rupturable diaphragm 53, and is filled with a colored liquid 54 freezing at a temperature slightly below the desired melting point. The outer shell 51 is partly filled with a similar liquid 55 of a different color and which freezes at the desired melting point. After freezing should the two liquids melt they will commingle to produce a mixture having a characteristic color or appearance readily distinguishable from the colors of the original liquids.

In the modification illustrated in Fig. 10, which is like that shown in Fig. 9 in having transparent shells 61, 62 enclosing a space for the liquid, capsule 63 is filled with liquid 64 of one color, and the other liquid 65 only partly fills the remaining space within the indicator. Preferably the liquid 64 has a slightly lower freezing point than the liquid 65, which melts at the warning temperature. The modifications illustrated in Figs. 9 and 10 are well adapted for use as tell-tale indicators in home freezers, grocer's storage cabinets, and in other freezer or cold storage structures to show rises in temperature likely to cause spoilage to the contents thereof that an ordinary thermometer will not record permanently.

In all of the forms of the invention illustrated for use with food containers, the colored liquids constituting the tell-tale device should be non-toxic (but under certain conditions may suitably be toxic) and stable under repeated freezing and thawing, and preferably are of pleasant flavor. For indicating the condition of many quick-frozen foods, such as meats, fish and vegetables, saline solutions of the desired freezing point are preferred because they may be commingled with the food by accident or intent to improve its flavor or increase its tastiness. The colors also may be selected to enhance the appearance of the food if commingled therewith. For examples, a bluish color or dye added to cauliflower will improve its appearance; and monosodium glutamate, which will enter into the solutions used, only affecting the freezing point slightly and will improve the natural flavor of a food product with which it is cooked. The simplicity in operation of the invention is self-evident in the preceding description. The indicator itself, without change of form or description, may be used alternately on, or in, large or small containers of any type now in use by the frozen food industry and may be positioned on the inside or outside surface of any frozen food container, as the case may be, or dropped unattached inside the container or carton, and may be used in any form herein described, and in many other forms, for example as a unit indicator for small individual containers or as an indicator to be used with a multiple-unit container, such as a shipping case containing many small individual containers.

Also, my invention has the advantages of compactness and sturdiness enabling it to be incorporated in all sizes and types of containers at low cost, combined with adequate sensitivity and permanence of its indications, and when adequately affixed to a carton is proof against tampering or removal without showing evidence thereof to the ultimate consumer.

From the foregoing description it is apparent that wide variations may be made in the shape of the device and in the materials used in its make up to suit the particular food products and form of package or place of use to which it is desired to apply the invention and the invention is not restricted to the embodiments illustrated.

I claim as my invention:

1. An indicator for a frozen food package comprising a transparent container and a frangible capsule within said container, said capsule and container being charged with differently colored liquids freezing and melting at approximately the safe temperature for preventing deterioration of quick-frozen food after freezing, one of said liquids freezing and melting at a lower temperature than the other the liquid charges in said container and capsule being respectively the lower freezing in the capsule and completely filling the latter and the higher freezing in the container but only partly filling it, whereby when said indicator is subjected to a temperature at which both said liquids freeze the capsule is burst by the liquid freezing therein without bursting the container.

2. An indicator for a frozen food package as set forth in claim 1 wherein the colored liquids are comestibles for enhancing the flavor of the packaged food with which it is used.

3. An indicator for a frozen food package as set forth in claim 1 wherein the colored liquids when commingled have a color that when mixed with the packaged food improves its appearance.

4. An indicator for cold areas to give warning of an occurrence of an elevated temperature therein at any time comprising a transparent container provided with two compartments separated by a frangible wall, one of said compartments being substantially filled with a liquid melting at a temperature below that to be indicated, the other of said compartments being partly filled with a liquid of a color distinguishable from the first named liquid and having a melting point at about the temperature to be indicated, said liquids when commingled producing a solution having a different and readily distinguishable color from the original colors thereof, whereby when frozen said lower melting liquid will burst said wall to permit commingling thereof with said higher melting liquid upon melting at any time thereafter.

5. An indicator for giving warning of a rise in temperature harmful to frozen products comprising a container having a transparent portion, two liquids in separate compartments therein having their respective freezing and melting points slightly different and no higher than the temperature to be indicated, said compartments being separated by a frangible wall and one containing enough liquid so that when frozen it bursts said wall, and said liquids being of different colors so that when commingled upon melting the appearance thereof visible through said container will be distinctively different from that observable prior to melting.

6. An indicator for frozen food packages and cold areas to give warning of an occurrence of an elevated temperature therein at any time comprising a transparent outer container provided with an inner container having a frangible wall, said inner container being substantially filled with a liquid melting at a temperature about that to be indicated, and the outer container being partly filled with a liquid of a color distinguishable from the first named liquid and having a slightly higher melting point, said liquids when commingled producing a solution having a different and readily distinguishable color from the original colors thereof, whereby when frozen said liquids will freeze successively and burst said wall to permit commingling thereof upon melting at any time thereafter.

CLARENCE L. SMITH.

References Cited in the file of this patent

UNITED STATES PATENTS

| Number | Name | Date |
|---|---|---|
| 1,774,258 | English | Aug. 26, 1930 |
| 1,873,286 | Chase II | Aug. 23, 1932 |
| 2,102,858 | Schlumbohm | Dec. 21, 1937 |
| 2,460,215 | Chase | Jan. 25, 1949 |

FOREIGN PATENTS

| Number | Country | Date |
|---|---|---|
| 71,957 | Norway | 1947 |